United States Patent [19]

Matsuyama

[11] 4,452,330
[45] Jun. 5, 1984

[54] ELECTRICAL APPARATUS IN MOTORIZED TWO-WHEELED VEHICLE

[75] Inventor: Youji Matsuyama, Higashiyamato, Japan

[73] Assignee: Honda Giken Kogyo Kabushiki Kaisha, Tokyo, Japan

[21] Appl. No.: 402,348

[22] Filed: Jul. 27, 1982

[30] Foreign Application Priority Data

Jul. 29, 1981 [JP]   Japan .................. 56-117743

[51] Int. Cl.³ .................. B62J 5/18; H02B 1/04
[52] U.S. Cl. ................................ 180/219; 307/9
[58] Field of Search .................. 180/219; 307/9; 123/478, 633

[56] References Cited

U.S. PATENT DOCUMENTS

| | | | |
|---|---|---|---|
| 3,927,727 | 12/1975 | Hanagan | 180/219 |
| 3,952,209 | 4/1976 | Shaklee et al. | 307/9 |
| 4,229,662 | 10/1980 | Nashimoto | 307/9 |
| 4,386,278 | 5/1983 | Kawada et al. | 307/9 |

FOREIGN PATENT DOCUMENTS 55-76788  5/1980  Japan .

*Primary Examiner*—Joseph F. Peters, Jr.
*Assistant Examiner*—Donn McGiehan
*Attorney, Agent, or Firm*—Armstrong, Nikaido, Marmelstein & Kubovcik

[57] ABSTRACT

An electrical apparatus in a two-wheeled vehicle is provided which has a body, with front and rear wheels being mounted on the body. An internal combustion engine is mounted on the body between the wheels. The electrical apparatus comprises an electronic control circuit for controlling the operation of the engine, a first wiring harness which couples the circuit to the engine and extends from the circuit to the engine along one side of the body, an electric power supply, at least one electric appliance and a second wiring harness which couples the one appliance to the power supply. The second harness extends along the other side of the body, whereby the first and second harnesses are separated such that noise from the second harness does not affect the first harness.

4 Claims, 3 Drawing Figures

ELECTRICAL APPARATUS IN MOTORIZED TWO-WHEELED VEHICLE

BACKGROUND OF THE INVENTION

1. Field of the Invention

This invention relates to an electronic control apparatus for a fuel injection system or the like in a motorized two-wheeled vehicle.

2. Description of the Prior Art

In the prior art, a vehicle body having front and rear wheels and an internal combustion engine in the middle thereof is provided with a control circuit unit for electronic control of a fuel injection system or the like. This prior art apparatus, however, has the disadvantage that a wiring harness for the electric cable connected to the control circuit unit is effected by noise from a wiring harness used for ordinary electric appliances so that wrong operation thereof is liable to occur.

SUMMARY OF THE INVENTION

It is an object of the present invention to provide an electrical apparatus for a two-wheeled vehicle such as a motorcycle, which eliminates electrical interference between an electrical appliance wiring harness and an electronic engine control circuit wiring harness.

It is a further object of the present invention to position an electronic control circuit wiring harness and an electrical appliance wiring harness with respect to each other such that the electrical interference therebetween is eliminated.

The present invention is directed to an electric control apparatus in a two-wheeled vehicle having a body, front and rear wheels mounted on said body and an internal combustion engine mounted on said body between said wheels. The electrical apparatus comprises an electronic control circuit for controlling the operation of the engine, such as fuel injection therefor, and a first wiring harness which couples the control circuit to the engine. The electrical apparatus also comprises an electric power supply, at least one electrical appliance wuch as a tail-light, and a second wiring harness for coupling the appliance to the power supply. The first and second wiring harnesses extend along opposite sides of the body to thereby eliminate electrical interference therebetween.

DETAILED DESCRIPTION OF THE PREFERRED EMBODIMENT

Figure 1:
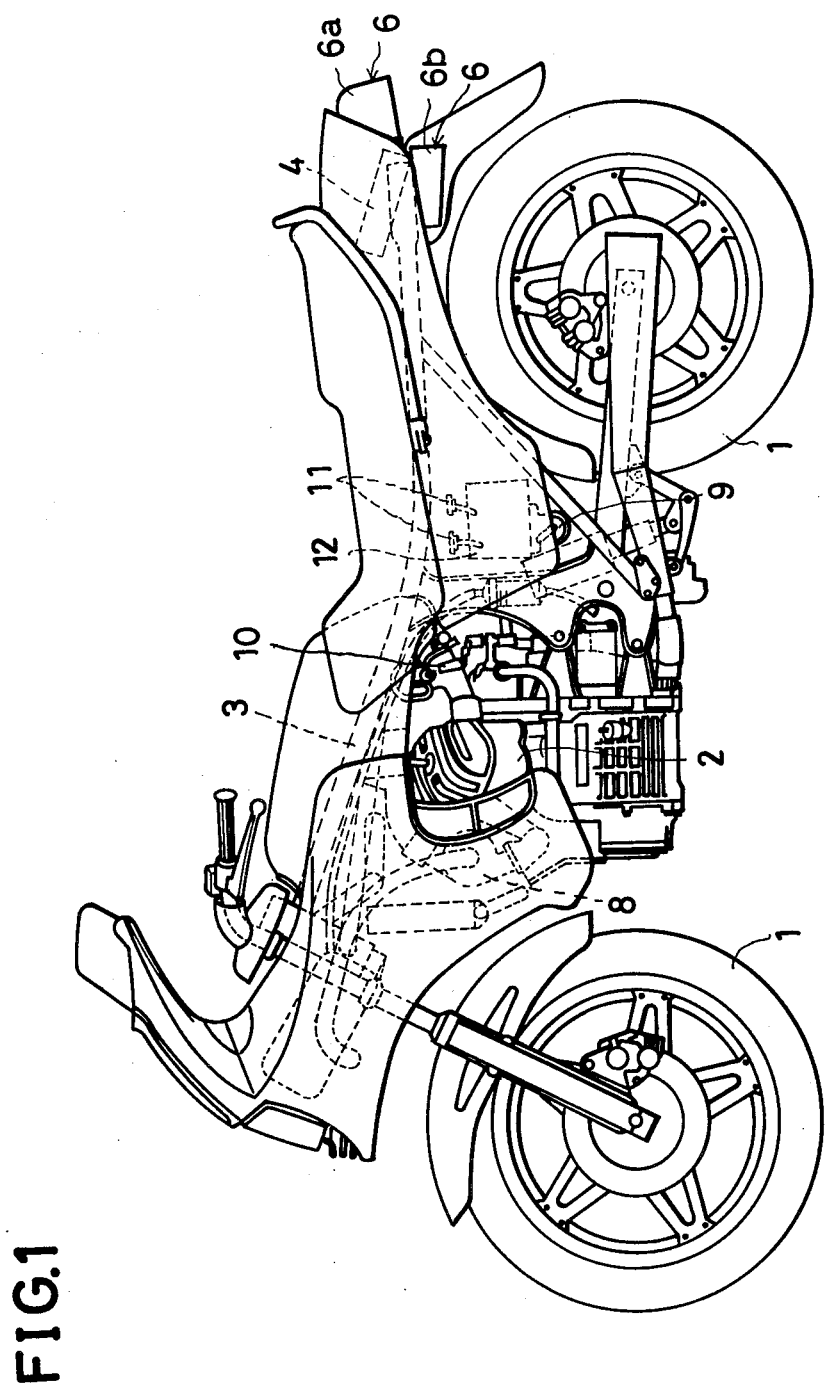
FIG. 1 is a side view of a motorized two-wheeled vehicle including the present invention.

Referring to the drawings, front and rear wheels 1 of a motorized two-wheeled vehicle have an internal combustion engine 2 mounted on a frame or body 3 between the wheels 1. A control circuit unit 4 for electronic control is mounted on the rear portion of the vehicle body 3. A wiring harness 5 for electronic control is connected to the unit 4 and a wiring harness 7 for ordinary use is connected to ordinary electric appliances 6. The wiring harnesses 5 and 7 are separated, one from another, to extend along on right and left frames 3a, 3b, respectively of the vehicle body 3.

Figure 2:
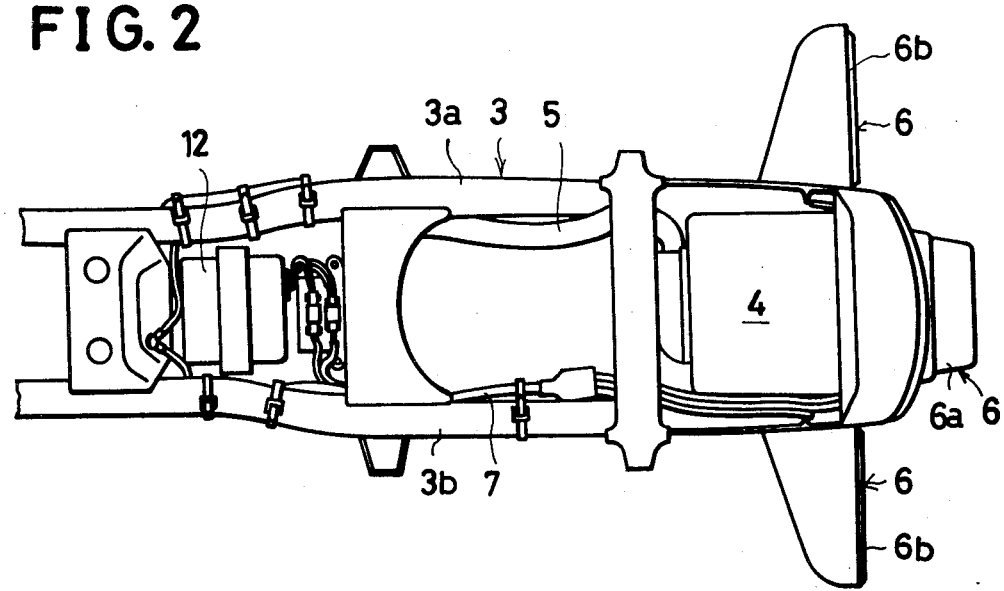
FIG. 2 is a top plan view of an important portion thereof, with a driver's seat being removed therefrom.
Figure 3:
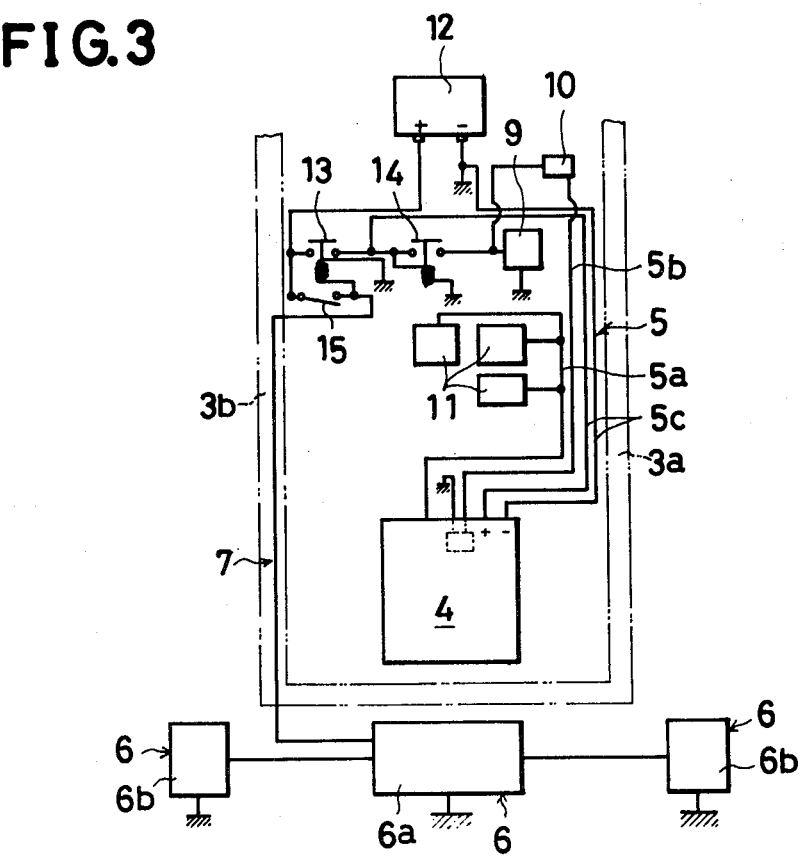
FIG. 3 is a circuit diagram thereof.

More in detail, the engine 2 is provided on its front side with a supercharger 8 and on its rearward side with a fuel pump 9 and a fuel injector 10 connected to the pump 9. An output signal of the control circuit unit 4 is applied to the injector 10 for controlling the opening and closing thereof, and thus the engine 2 is of the type that the injection fuel thereof is electronically controlled. The two wiring harnesses 5,7 are shown clearly in FIGS. 2 and 3. Namely, the wiring harness 5 comprises an input signal circuit 5a for connecting the circuit unit 4 in rear to three semiconductor sensors 11, 11 and 11 located below the spaced portion between the two frames 3a and 3b in front of the unit 4, an output signal circuit 5b for connecting the unit 4 to the injector 10 located in the front thereof, and a power supply circuit 5c for connecting the unit 4 to a battery type electric power source 12 located in front thereof. These circuits are so wired as to extend along the frame 3a on the right-hand side of the vehicle body 3, and the power supply circuit 5c has an electromagnetic switch 13 connected thereto and is connected through the switch 13 to a diverged circuit path to the fuel pump 9 and the injector 10 through another electromagnetic switch 14.

The wire harness 7 comprises a power supply circuit for connecting the applicances 6 in rear of the unit 4, that is, a tail-light 6a and right and left blinker lamps 6b, for example, to the electric power souce 12 located in front of the unit 4. The harness 7 is wired to extend along on the frame 3b on the left side of the vehicle body 3. The harness 7 has a switch 15 connected thereto.

Thus, the control circuit unit 4 is operated by closing the switch 13 and the fuel pump 9 and the fuel injector 10 are operated by closing of the switch 14. Consequently, the operation of the injector 10 is controlled by the output signal of the circuit unit 4. The ordinary electric appliances 6 are, however, operated by closing the switch 15.

Thus, according to this invention, the wiring harness for electronic control and the wiring harness for ordinary electric use are positioned apart from each other on the right side and on the left side so that the wiring harness for electronic control can be protected as much as possible from noise generated by the wiring harness for ordinary electric use. Accordingly, a signal circuit in the wiring harness for electronic control can be protected from the noise, thereby eliminating any generation of error in a delicate signal from a sensor, for instance, and the apparatus is simple in construction and low in manufacturing costs.

What is claimed:

1. An electrical apparatus in a two-wheeled vehicle having a body, front and rear wheels mounted on said body and an internal combustion engine mounted on said body between said wheels, said electrical apparatus comprising an electronic control circuit means for controlling the operation of said engine, a first wiring harness means coupling said circuit means to said engine and extending from said circuit means to said engine along one side of said body, an electric power supply, at least one electric appliance, and a second wiring harness means, coupling said at least one appliance to said power supply, said second harness means extending along the other side of said body whereby said first and second harness means are separated such that noise from said second harness means does not affect said first harness means.

2. An apparatus as set forth in claim 1 wherein said engine includes a fuel injection system and said circuit means controls the operation thereof.

3. An apparatus as set forth in claim 2 wherein said first harness means includes sensor means for sensing an engine condition, output means for connecting said circuit to said fuel injection system, and first power supply circuit means coupled to said power supply.

4. An apparatus as set forth in claim 1 wherein said at least one electrical appliance comprises a tail lamp and right and left blinker lamps and wherein said second harness means comprises a second power supply circuit means for connecting said appliances to said power supply.

* * * * *